(12) United States Patent
Sundman et al.

(10) Patent No.: US 10,390,304 B2
(45) Date of Patent: Aug. 20, 2019

(54) SLEEP DURING NAV/RID BACKOFF

(71) Applicant: Telefonaktiebolaget LM Ericsson (publ), Stockholm (SE)

(72) Inventors: Dennis Sundman, Solna (SE); Piergiuseppe Di Marco, Sollentuna (SE); Gustav Wikström, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/747,828

(22) PCT Filed: Aug. 6, 2015

(86) PCT No.: PCT/EP2015/068155
§ 371 (c)(1),
(2) Date: Jan. 26, 2018

(87) PCT Pub. No.: WO2017/020957
PCT Pub. Date: Feb. 9, 2017

(65) Prior Publication Data
US 2018/0220367 A1 Aug. 2, 2018

(51) Int. Cl.
H04W 52/02 (2009.01)
H04W 74/08 (2009.01)
H04W 84/12 (2009.01)
H04L 12/12 (2006.01)

(52) U.S. Cl.
CPC ......... *H04W 52/0216* (2013.01); *H04L 12/12* (2013.01); *H04W 74/085* (2013.01); *H04W 74/0816* (2013.01); *H04W 84/12* (2013.01); *Y02D 70/00* (2018.01); *Y02D 70/142* (2018.01); *Y02D 70/146* (2018.01)

(58) Field of Classification Search
CPC combination set(s) only.
See application file for complete search history.

(56) References Cited

U.S. PATENT DOCUMENTS

2008/0192721 A1 8/2008 Pernu et al.
2013/0235720 A1 9/2013 Wang et al.
(Continued)

FOREIGN PATENT DOCUMENTS

WO 2014 107031 A1 7/2014

OTHER PUBLICATIONS

PCT Notification of Transmittal of the International Search Report and the Written Opinion of the International Searching Authority, or the Declaration for International application No. PCT/EP2015/068155—dated Apr. 26, 2016.
(Continued)

*Primary Examiner* — Yee F Lam
(74) *Attorney, Agent, or Firm* — Patent Portfolio Builders, PLLC

(57) ABSTRACT

The present disclosure relates to a technique of supporting access to a wireless medium of a wireless communication network. A method embodiment comprises: when access of a station (100) to the wireless medium is delayed, determining (S202; S308), by the station, a back-off period indicating the period of time the access of the station to the wireless medium is delayed, and entering (S204; S312), by the station (100), into a sleep mode for a sleep period based on the determined back-off period.

12 Claims, 6 Drawing Sheets

(56) References Cited

U.S. PATENT DOCUMENTS

| | | | | |
|---|---|---|---|---|
| 2013/0294232 A1* | 11/2013 | Segev | ............... | H04W 28/06 |
| | | | | 370/230 |
| 2014/0254502 A1* | 9/2014 | Cai | ............... | H04W 48/20 |
| | | | | 370/329 |
| 2015/0103767 A1* | 4/2015 | Kim | ............... | H04W 74/06 |
| | | | | 370/329 |
| 2015/0341961 A1* | 11/2015 | Kim | ............... | H04W 74/0808 |
| | | | | 370/338 |
| 2016/0156437 A1* | 6/2016 | Li | ............... | H04W 74/0808 |
| | | | | 370/329 |
| 2016/0330708 A1* | 11/2016 | Seok | ............... | H04W 52/0216 |

OTHER PUBLICATIONS

IEEE P802.11ah/D4.0; Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation—Jan. 2015

\* cited by examiner

SLEEP DURING NAV/RID BACKOFF

PRIORITY

This nonprovisional application is a U.S. National Stage Filing under 35 U.S.C § 371 of International Patent Application Serial No. PCT/EP2015/068155 filed Aug. 6, 2015, and entitled "SLEEP DURING NAV/RID BACKOFF."

TECHNICAL FIELD

The present disclosure relates to a technique of supporting access to a wireless medium of a wireless communication network.

BACKGROUND

Contention-based multiple access protocols use carrier sensing and back off mechanisms to reduce the probability of collision. For example, carrier sense multiple access (CSMA) is a probabilistic media access control (MAC) protocol in which a node verifies the absence of other traffic before transmitting on a shared transmission medium, such as an electrical bus, or a band of the electromagnetic spectrum. Carrier sense generally means that a transmitter uses feedback from a receiver to determine whether another transmission is in progress before initiating a transmission. That is, carrier sense tries to detect the presence of a carrier wave from another station before attempting to transmit. If a carrier is sensed, the station waits for the transmission in progress to finish before initiating its own transmission. In other words, CSMA is based on the principle "sense before transmit" or "listen before talk". Multiple access generally means that multiple stations send and receive on the medium. Transmissions by one node are generally received by all other stations connected to the medium.

In consequence, a transmitting device normally listens to the channel for a minimum amount of time. If the channel is sensed to be occupied by another transmission, the transmitting device defers its transmission to a future time.

During this time period from back off until the future time is reached, the device typically continues monitoring the status of the channel, thus consuming energy.

SUMMARY

Accordingly, there is a need for an energy efficient technique of supporting access to a wireless medium of a wireless communication network.

According to a first aspect, a method of supporting access to a wireless medium of a wireless communication network is provided. The method comprises, when access of a station to the wireless medium is delayed, determining, by the station, a back-off's period. The back-off period indicates the period of time the access of the station to the wireless medium is delayed. The method comprises entering, by the station, into a sleep mode for a sleep period based on the determined back-off period.

In other words, the step of determining may be understood as determining, by the station, a back-off period, when the station has to back-off (interchangeably used herein as back off and back-off) from access to the wireless medium. The back-off period indicates the period of time the station has to back-off from the access to the wireless medium. For example, it may have been determined by way of carrier sensing that the station has to back off from access to the wireless medium because is there is other traffic on the (shared) wireless medium.

In general, access to the channel may comprise transmission over the channel. In consequence, the method may comprise, when transmission of the station over the wireless medium is delayed, determining, by the station, a back-off period. The wireless medium may be or comprise any wireless or wired channel. The back-off period indicates the period of time the access of the station to the wireless medium is delayed. To give a non-limiting example for the wireless communication network, the wireless communication network may be any wireless local area network (WLAN) based on the Institute of Electrical and Electronics Engineers' (IEEE) 802.11 standards. The station may be or comprise an Access Point (AP) or a non-AP station, for example.

According to the first aspect, the station enters into a sleep mode for a sleep period based on the determined back-off period. For example, the sleep period may be determined based on the back-off period. By entering the sleep mode for a sleep period that is based on the determined back-off period, the station is not continuously monitoring the status of the wireless medium during the back-off period, but is sleeping at least for the sleep period, thereby saving energy consumption.

The method may comprise determining the sleep period by considering the back-off period, the delay the station has to wait prior to the access to the wireless medium after entering into an awake state, and the duration for which the wireless medium has to be idle.

For example, the sleep period may be calculated by means of the following equation:

$$t_{sleep} = \max(W + DU - D, 0).$$

In this equation, $t_{sleep}$ indicates the sleep period, W indicates the back-off period, D indicates the delay the station has to wait prior to the access to the wireless medium after entering into an awake state, and DU indicates the duration for which the wireless medium has to be idle.

During the back-off period W, the station has to back-off from the wireless medium, e.g., because the wireless medium is known to be busy. After entering the awake state, the station has to wait for the delay D prior to the access to the wireless medium, e.g. the station needs to listen for at least the delay D. The wireless medium has to be idle for at least the duration DU. If the station wakes up after a sleep period corresponding to W+DU–D, it is ensured that the station can transmit at the earliest available time after it has listened to the wireless medium for the delay D and the wireless medium was idle for the duration DU. Any earlier wake up time might prolong the awake time and thus increase energy consumption. Any later wakeup time would increase the delay.

Thus, by setting the sleep period in accordance with the equation mentioned above, energy consumption is reduced when the station has to back-off from access to the wireless medium.

The delay the station has to wait prior to the access to the wireless medium after entering into the awake state may correspond to the probe delay. The duration for which the wireless medium has to be idle may correspond to the Distributed Coordination Function (DCF) InterFrame Space (DIFS) duration.

The method may comprise deriving, by the station, the back-off period from one or more packets received and decoded by the station. For example, the back-off period may be derived, by the station, from at least one of a Network Allocation Vector (NAV) and a Response Indication Deferral (RID). The received one or more packets may be packets of an ongoing transmission on the wireless medium causing the station to delay access to the wireless medium.

The method may comprise attempting to send a Power Save Poll (PS-Poll) frame and backing-off from sending the PS-Poll frame for the back-off period when another station sends a PS-Poll frame first.

The method may comprise entering, by the station, the sleep mode for the sleep period if the back-off period is larger than a time period calculated by subtracting the duration for which the wireless medium has to be idle from the delay the station has to wait prior to the access to the wireless medium after entering into an awake state. Using the equation above, the station may enter the sleep mode for the sleep period $t_{sleep}$ if W>D−DU (or W+DU>D). Otherwise (that is, if W<=D−DU/W+DU<=D), it may be determined that the station does not enter the sleep mode but simply backs-off from access to the channel. In this way, it might be ensured that the station only enters the sleep mode, if the back-off period is long enough for allowing the station to enter the sleep mode and at the same time not causing any transmission delays.

The method may comprise performing, by the station, clear channel assessment (CCA) on the wireless medium after waking up from the sleep mode. The method may comprise accessing, by the station, the wireless medium of the wireless communication network after waking up from the sleep mode. For example, the station may access the wireless medium after performing CCA.

According to a second aspect, a computer program is provided. The computer program comprises program code portions for causing the steps of any one of the method aspects described herein to be performed, when the computer program is run on a computer system or on one or more computing devices, e.g. an apparatus, a station, or an entity as disclosed herein. The computer program may be stored on a computer-readable recording medium or may be downloadable as a signal.

According to a third aspect, a station for accessing a wireless medium of a wireless communication network is provided. The station comprises an access component, a determining component and a sleep mode component. The access component is configured to access the wireless medium of the wireless communication network. The determining component is configured to determine a back-off period. The back-off period indicates a period of time the access of the station to the wireless medium is delayed. The sleep mode component is configured to instruct the station to enter into a sleep mode for a sleep period based on the determined back-off period.

The station according to the third aspect may be configured to perform any of the method steps of the method according to the first aspect described herein. The station may a non-AP station.

According to a fourth aspect, a system for supporting access to a wireless medium of a wireless communication network is provided. The system comprises one or more stations according to the third aspect.

At least one of the one or more stations may be configured as a non-AP station. The system may further comprise one or more APs.

The system according to the fourth aspect may be configured to perform any of the method steps of the method described herein.

In general, the steps of any one of the method aspects described herein may equally be embodied in one or more suitable components, devices or units, e.g. in suitable components of the station, and/or the system.

BRIEF DESCRIPTION OF THE DRAWINGS

In the following, the present disclosure will further be described with reference to exemplary embodiments illustrated in the Figures, in which.

DETAILED DESCRIPTION

In the following description, for purposes of explanation and not limitation, specific details are set forth, such as specific network topologies including particular network nodes, in order to provide a thorough understanding of the present disclosure. It will be apparent to one skilled in the art that the present disclosure may be practiced in other embodiments that depart from these specific details. For example, although the present disclosure is described with reference to specific Wi-Fi networks as an example for a wireless communication network, the present disclosure may be practiced in other networks to which mobile or stationary users may attach. For example, the present disclosure is applicable to any wireless local area network (WLAN) based on the Institute of Electrical and Electronics Engineers' (IEEE) 802.11 standards and related future standards. Further, although it is sometimes referred to below only to the IEEE 802.11ah standard, the general concepts described below may equally be applicable to communication networks conforming to other standards such as other IEEE 802.11 standards as well.

Those skilled in the art will further appreciate that functions explained herein below may be implemented using individual hardware circuitry, using software functioning in conjunction with one or more processors, e.g. a programmed microprocessor or a general purpose computer, using an Application Specific Integrated Circuit (ASIC) and/or using one or more Digital Signal Processors (DSPs). It will also be appreciated that when the present disclosure is described as a method, it may also be embodied in a computer processor arrangement and a memory arrangement coupled to a processor arrangement, wherein the memory arrangement is encoded with or stores one or more programs or corresponding code to cause the processor arrangement to perform or control the methods disclosed herein when executed by the processor arrangement.

Figure 1:
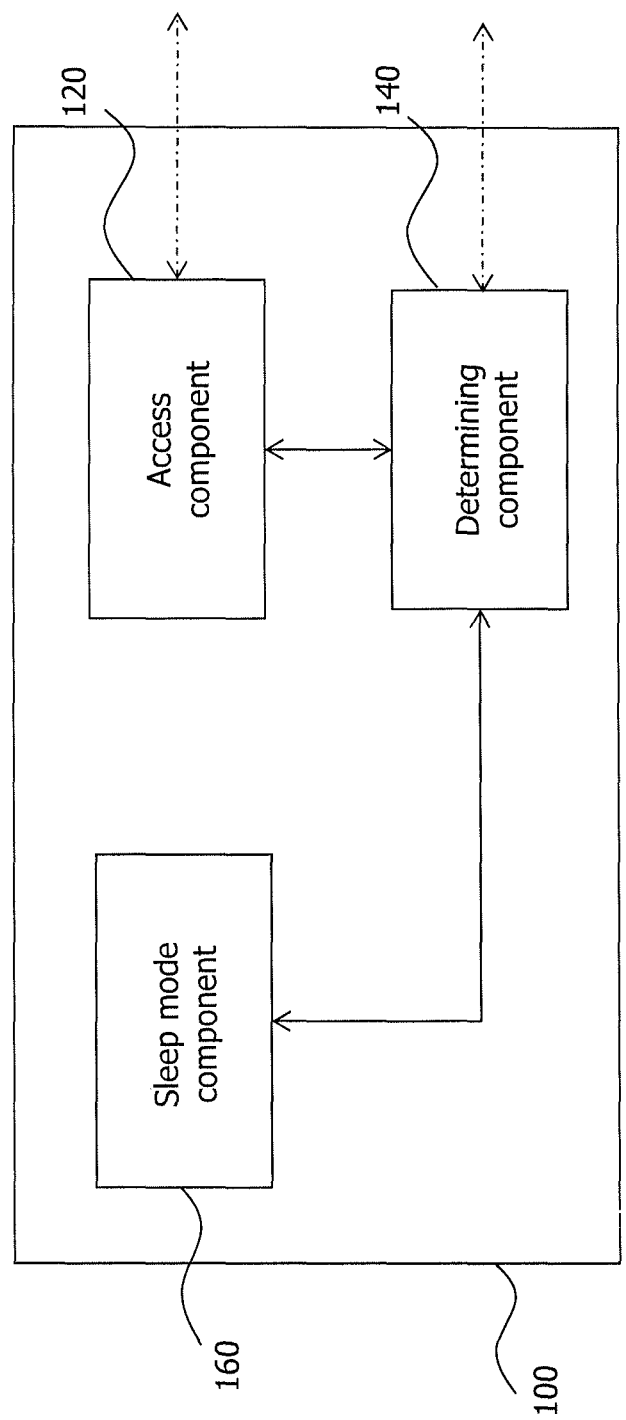
FIG. 1 is a schematic illustration of a station according to an embodiment.

FIG. 1 shows a station (STA) 100 according to a device embodiment for accessing a wireless medium of a wireless communication network. The wireless communication network may be a wireless communication network conforming to a Wi-Fi (also sometimes called WiFi) standard such as IEEE 802.11ah. STA 100 comprises an access component 120, a determining component 140 and a sleep mode component 160. The access component 120 is configured to access the wireless medium of the wireless communication network as indicated by the dashed-dotted line. The determining component 140 is configured to determine a back-off period indicating a period of time the access of STA 100 to the wireless medium is delayed as will be described in more detail below. The sleep mode component 160 is configured to instruct STA 100 to enter into a sleep mode for a sleep period based on the determined back-off period as will be described in more detail below. STA 100 may be a non-Access Point (non-AP) station.

Before further details of STA 100 are described with reference to FIGS. 2 to 6, some additional information is provided that is useful for understanding details of STA 100 and its operation.

IEEE 802.11ah (that is mentioned as an example for the wireless communication network used in connection with STA 100) is a wireless networking protocol that is an amendment of the IEEE 802.11-2007 wireless networking standard. IEEE 802.11ah supports power saving stations (power limited sensor stations). IEEE 802.11ah benefits from lower energy consumption, allowing the creation of large groups of stations or sensors that cooperate to share the signal, supporting the concept of the Internet of Things (IoT). To achieve long battery lifetime, the stations may be asleep for most of the time. When a station wakes up from doze state to awake, it normally has to perform one of two channel access mechanisms, namely either perform Clear Channel Assessment (CCA) until a frame sequence is detected by which it can correctly set its Response Indication Deferral (RID) or Network Allocation Vector (NAV), or monitor an idle channel until a period of time equal to the probe delay has expired. The probe delay is often understood as the time the station has to wait prior to the access to the wireless medium after entering into the awake state.

In WiFi technology the term "doze state" refers to a condition where the station, e.g., the radio chip of the station, is off. Doze state is the alternative to "awake state", where the station, e.g. the radio chip of the station, is on. The term "sleep mode" may refer to possible modalities in which the station operates. As an example, a station can be in "deep sleep" if the device is always in doze state, "light sleep" if the device alternates doze/awake states with certain duty cycles to keep synchronization, and so on. In light of this, in certain embodiments, the term "sleep mode" as used herein may be understood in its more specific sense as "doze state", opposed to an "awake" state. However, in certain embodiments it may be understood in its more general sense as "sleep mode".

Before accessing a wireless medium, every Wi-Fi station usually, first, has to determine the state of the medium as idle or busy through the process of carrier sense, prior to being allowed to perform pro-active collision avoidance and ultimately transmit a frame. Carrier sense is normally composed of CCA and the NAV, which together allow for adequate sensing of the physical environment as well as reserve the medium for frames critical to the operation of the protocol. In other words, Wi-Fi carrier sense may be considered to be composed of two separate and distinct functions, CCA and the NAV. From a high level perspective, CCA is physical carrier sense which listens to received energy on the radio interface. NAV is virtual carrier sense which is used by stations to reserve the medium for mandatory frames which must follow the current frame.

It is important to note that CCA is not the same as the NAV. CCA indicates a busy medium for the current frame, whereas NAV reserves the medium as busy for future frames that are required to be transmitted immediately following the current frame. Carrier sense refers the ability of the receiver to detect and decode an incoming Wi-Fi signal preamble. In addition, CCA must be reported as busy when another Wi-Fi signal preamble is detected, and must be held as busy for the length of the received frame as indicated in the frame's Physical Layer Convergence Protocol (PLCP) length field. Typically, any incoming Wi-Fi frame whose PLCP header can be decoded will cause CCA to report the medium as busy for the time required for the frame transmission to complete.

The NAV is a virtual carrier-sensing mechanism used with wireless network protocols such as IEEE 802.11 and IEEE 802.16 (WiMax). The virtual carrier sensing is a logical abstraction which limits the need for physical carrier-sensing at the air interface in order to save power. The MAC layer frame headers contain a duration field that specifies the transmission time required for the frame, in which time the medium will be busy. The stations listening on the wireless medium read the duration field and set their NAV, which is an indicator for a STA on how long it must defer from accessing the medium. So, in addition to CCA determining the medium idle/busy state for the current frame and noise, the NAV allows stations to indicate the amount of time required for transmission of required frames immediately following the current frame. This is important to reserve the medium as busy for these mandatory frames. The importance of NAV virtual carrier sense is to ensure medium reservation for frames critical to operation of the 802.11 protocol. Typically these are control frames, but not always. They include 802.11 acknowledgements, subsequent data and acknowledgement frames as part of a fragment burst, and data and acknowledgement frames following a Request to Send/Clear to Send (RTS/CTS) exchange.

The NAV may be thought of as a counter, which counts down to zero at a uniform rate. When the counter is zero, the virtual carrier sense indication is that the medium is idle; when nonzero, the indication is busy. The medium shall be determined to be busy when the STA is transmitting. In IEEE 802.11, the NAV represents the number of microseconds the sending STA intends to hold the medium busy. This number may correspond to a maximum of 32,767 microseconds, for example. To give another example, in 802.11ah, this largest number may be different, e.g., there may be a unified scaling factor (e.g. 2 bits), with which this number is scaled with either 1, 10, 1000, or 10000. A station decrements its NAV counter until it becomes zero, at which time it is awakened to sense the medium again. The NAV virtual carrier sensing mechanism is a prominent part of the Carrier sense multiple access with collision avoidance (CSMA/CA) MAC protocol used with IEEE 802.11 WLANs. NAV is used in DCF, Point Coordination Function (PCF) and Hybrid Coordination Function (HCF).

DCF is a MAC technique of the IEEE 802.11 based WLAN standard. DCF employs a CSMA/CA with binary exponential backoff algorithm. CSMA/CA in computer networking is a network multiple access method in which carrier sensing is used, but nodes attempt to avoid collisions by transmitting only when the channel is sensed to be idle. When they do transmit, nodes transmit their packet data in its entirety. DCF requires a station wishing to transmit to listen for the channel status for a DCF InterFrame Space (DIFS) interval. If the channel is found busy during the DIFS interval, the station defers its transmission. In a network where a number of stations contend for the wireless medium, if multiple stations sense the channel busy and defer their access, they will also virtually simultaneously find that the channel is released and then try to seize the channel. As a result, collisions may occur. In order to avoid such collisions, DCF also specifies random backoff, which forces a station to defer its access to the channel for an extra period.

Summarizing the above, if during the probe delay a transmission occurs on the channel, one of the following will happen: According to a first option, the station can decode the packet with received power surpassing the signal detect threshold, and accurately set its RID and/or NAV. Then the station backs off until the end of the RID/NAV and performs CCA. According to a second option, the station is unable to decode the packet, but the received energy surpasses the energy detect threshold. Then, the station monitors the channel until the transmission stops. The station then performs CCA. According to a third option, the received energy does not surpass the energy detect threshold and the channel is sensed to be free. In this case, the station has to wait at least a probe delay time before initiating transmission.

In the following, it will mainly be focused on the first option, when a station can decode the packet and accurately set its NAV/RID. As mentioned above, if the station can decode a packet and can set its RID or NAV, it has to defer from the medium for a certain back-off time plus the DIFS. In a congested scenario where a prior art station detects a transmission during a probe delay, it will waste energy while being awake but in back off state.

Figure 2:
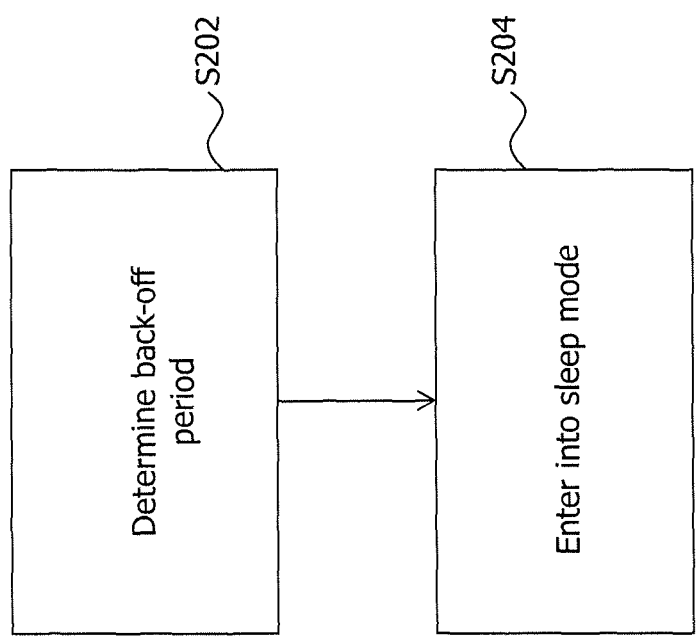
FIG. 2 is a flowchart illustrating a first method embodiment performed in the station of FIG. 1.

FIG. 2 shows a method embodiment which can be implemented in STA 100 shown in FIG. 1. In step S202, a back-off period is determined by the determining component 140 when access of the station 100 to the wireless medium is delayed. For example, the access component 120 may have intended to access the wireless medium. The back-off period indicates the period of time the access of STA 100 to the wireless medium is delayed. In step S204, the sleep mode component 160 instructs STA 100 to entering into a sleep mode for a sleep period based on the determined back-off period.

In other words, the method comprises determining, by the determining component 140, a back-off period, when STA 100 has to back-off from access to the wireless medium. The back-off period indicates the period of time STA 100 has to back-off from the access to the wireless medium.

Figure 3:
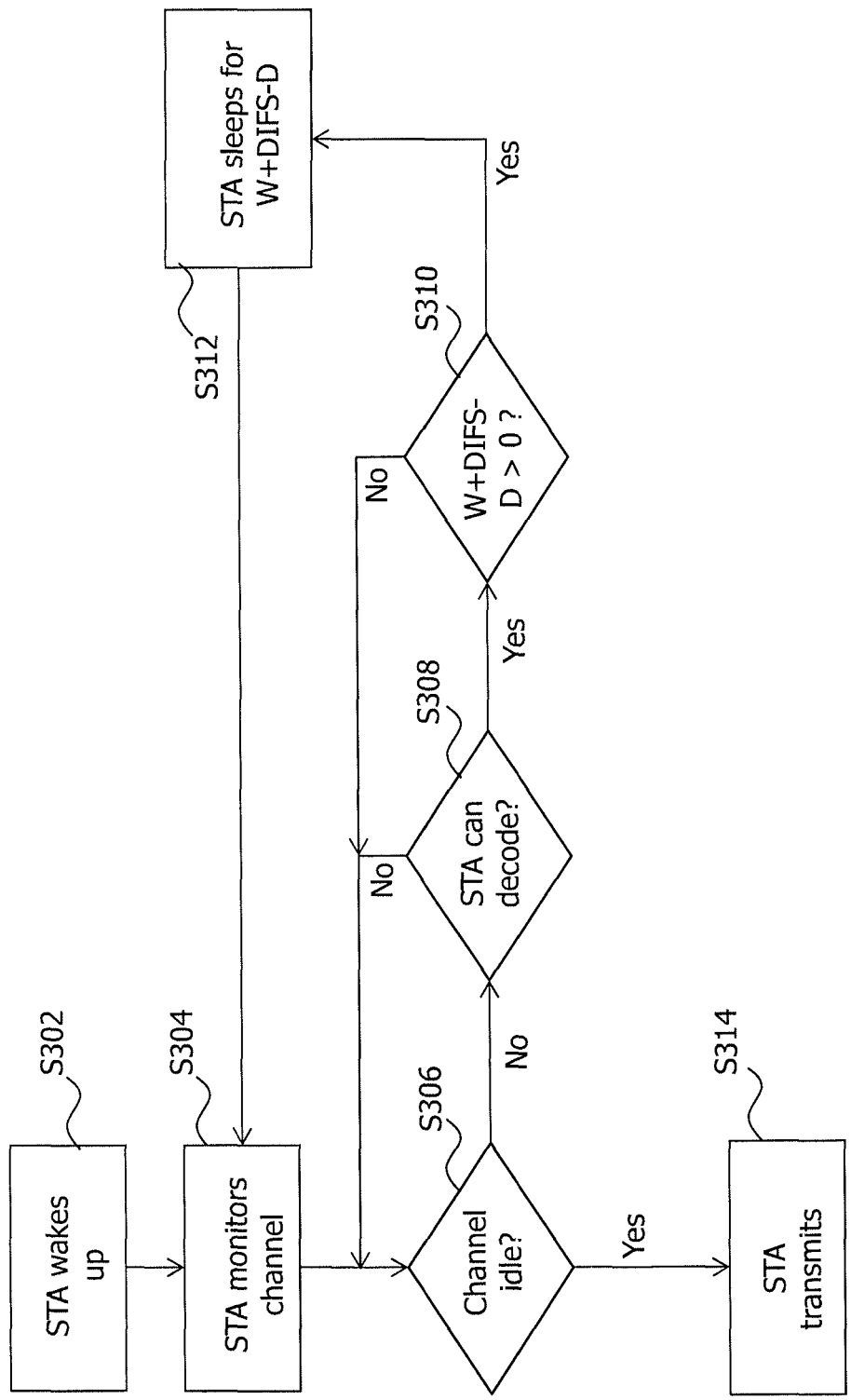
FIG. 3 is a flowchart illustrating a second method embodiment performed in the station of FIG. 1.
Figure 4:
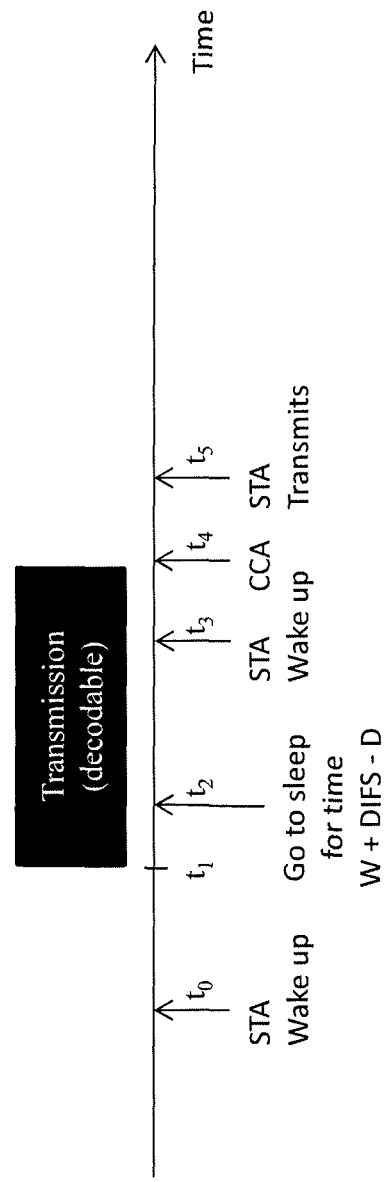
FIG. 4 is a schematic illustration of further possible details of the station of FIG. 1 and the method embodiments of FIGS. 2 and 3.

Specific details which may be implemented in or by STA 100 of FIG. 1 and the method of FIG. 2 are further explained with respect to FIGS. 3 and 4.

STA 100 wakes up from sleep mode (or doze state) at time $t_0$ in step S302. STA 100 intends to access a channel (as an example of a wireless medium) in the future, e.g. it intends to transmit data over the channel. Therefore, STA 100 monitors the channel in step S304. In other words, for example, STA 100 with either data to transmit or some other message to send (e.g., PS-Poll), awakes at the time $t_0$, after which it monitors the channel (step S304) during a probe delay D. In step S306, it is determined, based on the monitoring, whether the channel is idle.

At time $t_1$ another transmission starts, in which STA 100 is not involved. The transmission block schematically illustrated in FIG. 4 may be an ongoing communication which may or may not be or include several packets from several stations. Thus, in step S306, STA 100 determines that, as of time $t_1$, the channel is not idle. The transmission is detected and decoded at time $t_{detect}$. For sake of simplicity, it is assumed herein that the time $t_1$ at which the transmission starts corresponds to the time $t_{detect}$ at which it is detected by STA 100 that the transmission has started. It is assumed in the following that STA 100 intends to access the channel, e.g. it intends to transmit data over the channel, (shortly) after the time $t_1$. As STA 100 has detected an ongoing transmission, STA 100 has to back-off from accessing the channel/the access to the channel is delayed for a back-off period. In step S308, STA 100 determines whether it can decode the ongoing transmission in order to determine the back-off period, e.g. from the NAV or RID. If not, it cannot calculate a suitable sleep period and does not enter sleep mode. If query S308 is answered to the affirmative, i.e. STA 100 can decode the ongoing transmission, it derives the back-off period from at least one of the NAV and the RID included in one or more packets of the ongoing transmission. In other words, STA 100 derives the back-off period from one or more packets received and decoded by the STA 100. STA 100 sets a back-off period (waiting time) W indicated by NAV, RID, or another period.

Returning to the initial example of STA 100 waking up at time $t_0$, if during the probe delay a transmission occurs and STA 100 decodes the packet accurately and set its RID and/or NAV, STA 100 goes to sleep at time $t_2$ for a duration that is dependent on the RID and/or NAV, thus setting the back-off period W to a value that is based on the NAV or RID and the sleep period to a values that is based on the back-off period, instead of monitoring the channel unnecessarily. Another example would be a sleeping STA that periodically wakes up to read the TIM message. If the STA has data to download, it attempts to send a PS-Poll. If some other STA sends a PS-Poll first, the current STA has to back-off. Again, the current STA goes to sleep instead of monitoring the channel.

In summary, instead of staying awake and monitoring the channel during the back-off period, thereby wasting energy, STA 100 enters sleep mode at time $t_2$ for a sleep period. As mentioned above, STA 100 considers the RID and/or NAV for setting the sleep period. Further, STA 100 considers the delay STA 100 has to wait prior to the access to the wireless medium after entering into an awake state and the duration for which the wireless medium has to be idle. The delay STA 100 has to wait prior to the access to the wireless medium after entering into the awake state may correspond to the probe delay. The duration for which the wireless medium has to be is idle may correspond to the DIFS duration.

For example, the sleep period may be calculated in step S310 by means of the following equation:

$$t_{sleep} = \max(W + DIFS - D, 0).$$

In this equation, $t_{sleep}$ indicates the sleep period, W indicates the back-off period, D indicates the delay STA 100 has to wait prior to the access to the wireless medium after entering into an awake state, and DIFS indicates the duration for which the wireless medium has to be idle. Further, in query S310 the higher value of 0 and W+DIFS−D is selected for the sleep period $t_{sleep}$. If W+DIFS−D is not larger than 0, STA 100 does not enter sleep mode during the back-off period. If, however, W+DIFS−D is larger than 0, STA 100 enters sleep mode at time $t_2$ for the determined sleep period $t_{sleep}$ in step S312. In the example shown in FIG. 4, STA 100 enters sleep mode at time $t_2$ and sleeps until it wakes up at time $t_3$. Thus, in the example of FIG. 4, $t_{sleep} = t_3 - t_2$.

As described above, during the back-off period W, STA 100 has to back-off from the wireless medium, e.g., because the wireless medium is known to be busy. After entering the awake state, STA 100 has to wait for the probe delay D prior to the access to the wireless medium, e.g. the station needs to listen for at least the probe delay D. The wireless medium has to be idle for at least the duration DIFS. If the station wakes up at W+DIFS−D, it is ensured that it can transmit at the earliest available time (W+DIFS) after it has listened to the wireless medium for the delay D and the wireless medium was idle for a duration DIFS. Any earlier wake up time would prolong the awake time and thus energy consumption. Any later wakeup time would increase the delay. The wakeup time is chosen such that STA 100 includes the interframe space (i.e., DIFS) and the probe delay (herein indicated as D) in an efficient way. If the time W is longer than (D−DIFS), the sleep period is set to be (W+DIFS−D). In this sense, when the probe delay has passed, the channel has been idle for DIFS (since D>DIFS) and if the channel is idle, STA 100 can transmit immediately. If the time W is equal to, or shorter than, D−DIFS, STA 100 does not go to sleep. Thus, the sleep mode is only entered for the sleep period if the back-off period is larger than a time period calculated by subtracting the duration for which the wireless medium has to be idle, i.e. DIFS in the present example, from the delay the station has to wait prior to the access to the wireless medium after entering into an awake state, i.e. the probe delay D in the present example. Using the equation above, STA 100 enters the sleep mode for the sleep period $t_{sleep}$ if W>D−DIFS (or W+DIFS>D).

By adding the DIFS to the back-off time W it is ensured that the wireless medium is idle for the minimum time the wireless medium has to be idle prior to channel access. Thus, in order to ensure that the sleep period is at least DIFS, DIFS is added. Otherwise, STA 100 cannot access the channel. More particularly, STA 100 will only sleep when the back-off time W is longer than the probe delay D minus DIFS. One of the reasons for adding DIFS is that the predetermined time W (e.g., NAV) is the time the channel is known to be busy. STA 100 has to listen for at least D and the channel has to be idle for at least DIFS. If STA 100 wakes up at W+DIFS−D, it can be ensured that it can transmit at the earliest available time after it has listened to the channel for a time D and that the channel was idle for at least a time DIPS. Any earlier wake up time would prolong the awake time, any later wakeup time would increase the delay. Generally, STA 100 needs to be awake either for probe delay time or until it synchronizes with a network. For example, it could awake a bit later if it could somehow synchronize. However, since a transmission is going on, STA 100 does not have the chance to synchronize, and consequently has to defer from transmitting for probe delay time.

Summarizing the STA's sleep behavior: If STA 100 detects an ongoing transmission, e.g. an 802.11 transmission, during the probe delay D and can decode it, it goes to sleep by considering a value of W equal to NAV, RID, for example, or another time indication. More precisely, STA 100 goes to sleep for W+DIFS−D.

After sleeping for the sleep period, STA 100 wakes up at time $t_{detect}+t_{sleep}$ and monitors the channel. The channel will then likely be occupied by the transmission as shown by way of example in FIG. 4, and STA 100 will continue to monitor the channel until the transmission stops. At this point, STA 200 has been awake for a probe delay and it can therefore perform CCA, and if the channel is sensed to be idle in step S306, STA 100 can transmit (step S314). With reference to FIG. 4, after waking up at time $t_3$, STA 100 performs CCA at time $t_4$. If it is sensed that the channel is idle in step S306, STA 100 accesses the channel in step S314, e.g. it transmits at time $t_5$.

It is proposed herein for power efficiency purposes that whenever a node's channel access such as a transmission of STA 100 is delayed by an indicated time W (e.g., equal to the NAV), it should go to sleep mode for a sleep period. This may be done by setting a wake up timer by adding the determined sleep period to the time at which the node goes to sleep. In this way, energy consumption of a node is reduced by spending more time being asleep, and thereby extending the battery lifetime of the node such as sensor STA's. Although the node such as STA 100 spends more time asleep, the proposed technique does normally not increase the delay of transmission compared to the prior art. So, any 802.11 STA, for example, can save battery lifetime by sleeping during transmission deferral or waiting time without introducing additional delays in the transmission. Even a specific implementation option is given by means of the precise equation above for selecting the sleep time.

Figure 5:
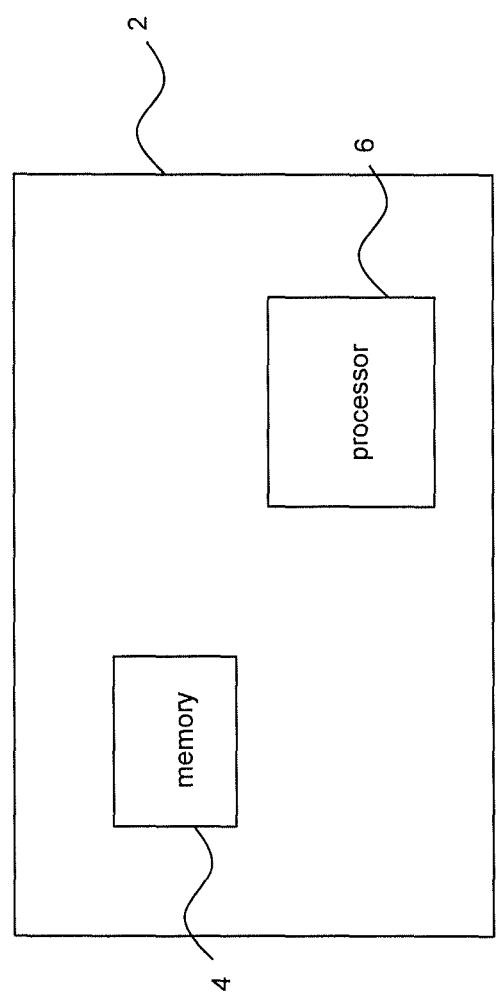
FIG. 5 is a block diagram schematically illustrating another device embodiment for implementing the station of FIG. 1.

The details explained above with respect to FIGS. 1 to 4 may be summarized with respect to FIG. 5. FIG. 5 is a block diagram schematically illustrating a device embodiment of a node 2 for supporting access to a wireless medium of a wireless communication network.

By way of example, the node 2 is described to implement the functionalities of STA 100 according to the embodiment of FIG. 1. The node 2 comprises a memory or memory arrangement 4 and a processor or processor arrangement 6. The memory or memory arrangement 4 contains control instructions or program code portions executable by the processor or processor arrangement 6. The processor or processor arrangement is configured to, when access of STA 100 to the wireless medium is delayed, determine a back-off period indicating the period of time the access of STA 100 to the wireless medium is delayed and/or executing the control instruction in the memory or memory arrangement. The processor or processor arrangement 6 is configured to instruct STA 100 to enter into a sleep mode for a sleep period based on the determined back-off period. A processor arrangement may generally comprise one or more than one processors and/or processor cores. A processor or processor core may comprise integrated control or processing circuitry. A memory arrangement may comprise one or more than one memories, which may be of same or different types. A memory may comprise RAM (Random Access Memory), ROM (Read-Only Memory), EPROM, cache memory, optical memory, etc.

Figure 6:
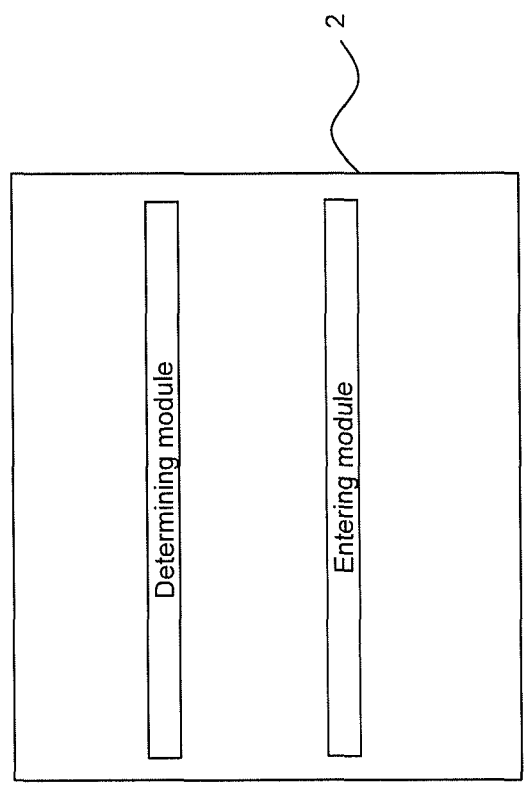
FIG. 6 is a block diagram schematically illustrating another device embodiment for implementing the station of FIG. 1.

FIG. 6 shows a functional block diagram of a device or node 2 configured in accordance with the principles of the disclosure as described above. In particular, device or node 2 may be seen as representing an apparatus such as STA 100 for supporting access to a wireless medium of a wireless communication network as disclosed herein. The functional blocks of the device may be implemented by hardware, software, or a combination of hardware and software to carry out the principles of the disclosure. It is understood by a person skilled in the art that the functional blocks described in FIG. 6 may be combined or separated into sub-blocks to implement the principles of the disclosure as described above. Therefore, the description herein may support any possible combination or separation or further definition of the functional blocks described herein. The device of FIG. 6 is for supporting access to a wireless medium of a wireless communication network. The device 2 comprises a determining module for determining a back-off period indicating the period of time the access of a station to the wireless medium is delayed, when access of the station to the wireless medium is delayed. The device 2 further comprises a sleep mode module for instructing the device to enter into a sleep mode for a sleep period based on the determined back-off period.

Many advantages of the present disclosure will be fully understood from the foregoing description, and it will be apparent that various changes may be made in the form, construction and arrangement of the units and devices without departing from the scope of the present disclosure and/or without sacrificing all of its advantages. Since the present disclosure can be varied in many ways, it will be recognized that the present disclosure should be limited only by the scope of the following claims.

The invention claimed is:

1. A method of supporting access to a wireless medium of a wireless communication network, the method comprising:
when the access of a station to the wireless medium is delayed, determining, by the station, a back-off period indicating a period of time the access of the station to the wireless medium is delayed;
determining, by the station, a sleep period by considering the back-off period, a delay the station has to wait prior to the access to the wireless medium after entering into an awake state, and a duration for which the wireless medium has to be idle; and
entering, by the station, into a sleep mode for the sleep period when the back-off period is larger than a time period calculated by subtracting the duration for which the wireless medium has to be idle from the delay the station has to wait prior to the access to the wireless medium after entering into the awake state.

2. The method of claim 1, wherein the sleep period is determined by means of the following equation:

$$t_{sleep} = \max(W + DU - D, 0),$$

wherein $t_{sleep}$ indicates the sleep period, W indicates the back-off period, D indicates the delay the station has to wait prior to the access to the wireless medium after entering into the awake state, and DU indicates the duration for which the wireless medium has to be idle.

3. The method of claim 1, wherein the delay the station has to wait prior to the access to the wireless medium after entering into the awake state corresponds to a probe delay.

4. The method of claim 1, wherein the duration for which the wireless medium has to be idle corresponds to a Distributed Coordination Function (DCF) InterFrame Space (DIFS) duration.

5. The method of claim 1, wherein the method further comprises deriving, by the station, the back-off period from one or more packets received and decoded by the station.

6. The method of claim 1, wherein the method further comprises: attempting to send a Power Save Poll (PS-Poll) frame; and backing-off from sending the PS-Poll frame for the back-off period when another station sends a PS-Poll frame first.

7. The method of claim 1, wherein the method further comprises performing, by the station, clear channel assessment (CCA) on the wireless medium after waking up from the sleep mode.

8. The method of claim 1, wherein the method further comprises accessing, by the station, the wireless medium of the wireless communication network after waking up from the sleep mode.

9. The method of claim 1, wherein the back-off period is derived, by the station, from at least one of a Network Allocation Vector (NAV) and a Response Indication Deferral (RID).

10. A station for accessing a wireless medium of a wireless communication network, the station comprising one or more processors and a memory, the memory comprising instructions executable by the one or more processors, such that the one or more processors are configured to:
access the wireless medium of the wireless communication network;
determine a back-off period that indicates a period of time the access of the station to the wireless medium is delayed; and
instruct the station to enter into a sleep mode for a sleep period when the back-off period is larger than a time period calculated by subtracting a duration for which the wireless medium has to be idle from a delay the station has to wait prior to the access to the wireless medium after entering into an awake state.

11. A system for supporting access to a wireless medium of a wireless communication network, the system comprising one or more stations, each of the one or more stations comprising one or more processors and a memory, the memory comprising instructions executable by the one or more processors, such that the one or more processors are configured to:
access the wireless medium of the wireless communication network;
determine a back-off period that indicates a period of time the access of a station, of the one or more stations, to the wireless medium is delayed; and
instruct the station to enter into a sleep mode for a sleep period when the back-off period is larger than a time period calculated by subtracting a duration for which the wireless medium has to be idle from a delay the station has to wait prior to the access to the wireless medium after entering into an awake state.

12. The system of claim 11, wherein at least one of the one or more stations is configured as a non-Access Point (non-AP) station, and wherein the system comprises one or more Access Points (APs).

* * * * *